United States Patent
Haudrich et al.

(10) Patent No.: US 7,617,166 B2
(45) Date of Patent: Nov. 10, 2009

(54) NEURAL NETWORK FOR AEROELASTIC ANALYSIS

(75) Inventors: Darin P. Haudrich, Waterloo, IL (US); Dale M. Pitt, Affton, MO (US)

(73) Assignee: The Boeing Company, Chicago, IL (US)

(*) Notice: Subject to any disclaimer, the term of this patent is extended or adjusted under 35 U.S.C. 154(b) by 195 days.

(21) Appl. No.: 10/825,032

(22) Filed: Apr. 14, 2004

(65) Prior Publication Data
US 2005/0234839 A1 Oct. 20, 2005

(51) Int. Cl.
*G06E 1/00* (2006.01)
*G06E 3/00* (2006.01)
*G06G 7/00* (2006.01)

(52) U.S. Cl. ......................................................... 706/22

(58) Field of Classification Search ..................... 706/1, 706/15, 45, 20, 26, 23, 34, 35, 21, 25, 12, 706/16, 11; 700/1, 90, 104, 49; 244/54; 14/18; 600/535; 416/23, 231 R; 60/795; 701/120, 114

See application file for complete search history.

(56) References Cited

U.S. PATENT DOCUMENTS

| | | | | |
|---|---|---|---|---|
| 4,840,069 | A * | 6/1989 | Hampton et al. | 73/802 |
| 5,746,391 | A * | 5/1998 | Rodgers et al. | 244/54 |
| 5,784,739 | A * | 7/1998 | Kawada et al. | 14/18 |
| 6,014,024 | A * | 1/2000 | Hockey et al. | 324/240 |
| 6,189,830 | B1 * | 2/2001 | Schnelz et al. | 244/54 |
| 2003/0191406 | A1 * | 10/2003 | Eberhart et al. | 600/535 |

OTHER PUBLICATIONS

'Adaptive nonlinear neural network controller for rotorcraft vibration', Spencer, Sanner, Chopra, 1997, SPIE vol. 3041, 538-553.*
'Aeroelasticity of morphing wings using neural networks': Natarajan, 2002, Natarajan, abstract, 21, 44-64, 74.*
'Small Business Innovation Research to Support Aing Aircraft'; 2000; National Academy of Sciences; Publication NMAB-497; http://darwin.nap.edu/books/NI000345/html/47.html; pp. 13-46.*
'Adaptive nonlinear neural network controller for rotorcraft vibration'; 1997, SPIE vol. 3041, 0277-786X, pp. 538-553.*
'Aeroelasticity of Morphing Wings Using Neural Networks'; Anand Natarajan; Jul. 2002; Virginia Polytechnic Institute and State University.*
'Small Business Innovation Research to Support Aging Aircraft': NMAB-497, 2001, National Academy Press, publication NMAB-497, pp. 11, 21, 29-30, 41-43.*
'Elements of Artificial Neural Networks': Mehrotra, 1997, MIT Press, pp. 11, 13-14, 65, 103-104, 130-133.*
'Materials mechanics—the basis of advanced technology for ageing aircraft': Boller, 2001, Werkstofftech, 32, pp. 388-397.*
'Integrated decision support for aviation safety inspectors': Luxhoj, 1996, Elsevier, Finite elements in analysis and design, pp. 381-403.*

* cited by examiner

*Primary Examiner*—David R Vincent
*Assistant Examiner*—Peter Coughlan
(74) *Attorney, Agent, or Firm*—Rozenblat IP LLC

(57) ABSTRACT

A system and method of performing aeroelastic analysis using a neural network. Input parameters, such as mass and location, contributing to aeroelastic characterization are determined and constrained. A model of a structure to be analyzed can be constructed. The model can include a number of locations where the input parameters can be varied. The aeroelastic characteristic of the structure can be analyzed using a finite element model to determine a number of output characteristics, each of which can correspond to at least one of a plurality of input samples. A neural network can be generated for determining the aeroelastic characteristic based on input parameters. The input sample/output characteristic pairs can be used to train the neural network. The weights and bias values from the trained neural network can be used to generate a non-linear transfer function that generates the aeroelastic characteristic in response to input parameters.

47 Claims, 14 Drawing Sheets

NEURAL NETWORK FOR AEROELASTIC ANALYSIS

BACKGROUND OF THE DISCLOSURE

1. Field of the Disclosure

The disclosure relates generally to the field of aeroelastic analysis. More particularly, the present disclosure relates to a neural network for aeroelastic analysis.

2. Description of Related Art

Aeroelastic analysis is typically used in the aerospace industry to characterize aircraft and structures that form part of or that affect the stability of the aircraft. Aircraft are increasingly designed for and subjected to longer service lives. As a result, one or more structures on an aircraft may be repaired or altered during the life of the structure. Any repair or alteration of an aircraft structure may affect the aeroelastic characteristics of the aircraft.

To ensure that a structural repair or modification does not detrimentally affect the safety or flight characteristics of the aircraft, the repaired or modified structure may be subjected to aeroelastic analysis, such as aeroelastic stability or flutter analysis.

A flutter assessment for repairs of a surface, such as a surface of a wing or tail section, can be more detailed than non-repair flutter analysis because the analysis typically needs to determine the effects of additional mass. Each individual repair to a surface may need to be accounted for in the analysis, and there may be numerous surface repairs. The desire to perform aeroelastic analysis may be heightened when the locations and weights of repairs exceed a predetermined category of approved repair parameters.

Typically, technicians at a repair facility provide the exact locations and weights of the repairs to an engineering team that includes an aeroelastic engineer. The aeroelastic engineer can conduct a detailed structural analysis using a finite element model of the structure. It may take several hours to days to perform the structural analysis for the finite element model. The aeroelastic engineer uses the results of the structural analysis to ensure the modifications or repairs do not affect the structure in a mariner that changes critical flutter mechanisms of the structure.

The aeroelastic engineer uses the results of the finite element model to perform flutter analysis. The aeroelastic engineer may, for example, create mode shapes for the model for one or more of the modes critical to flutter mechanism. The entire process from initial repair to return of flutter assessment may take on the order of one to two weeks.

Because the safety of the aircraft may be in question after performance of the repair, the time required to perform the aeroelastic analysis may represent a period in which the aircraft is grounded and unavailable. The process of performing the aeroelastic analysis is costly and having downed flight time for aircraft is exceedingly costly.

BRIEF SUMMARY OF THE DISCLOSURE

A system and method of performing aeroelastic analysis using a neural network are disclosed. Input parameters, such as mass and location, contributing to aeroelastic stability characterization are determined and constrained. A model of a structure to be analyzed can be constructed. The model can include a number of locations where the input parameters can be varied. The aeroelastic characteristic of the structure can be analyzed using a finite element model to determine a number of output characteristics, each of which can correspond to at least one of a plurality of input samples. A neural network can be generated for determining the aeroelastic characteristic based on input parameters. The input sample/output characteristic pairs can be used to train the neural network. The weights and bias values from the trained neural network can be used to generate a non-linear transfer function that generates the aeroelastic characteristic in response to input parameters.

The features, functions, and advantages can be achieved independently in various embodiments of the present disclosure or may be combined in yet other embodiments.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

Figure 1:
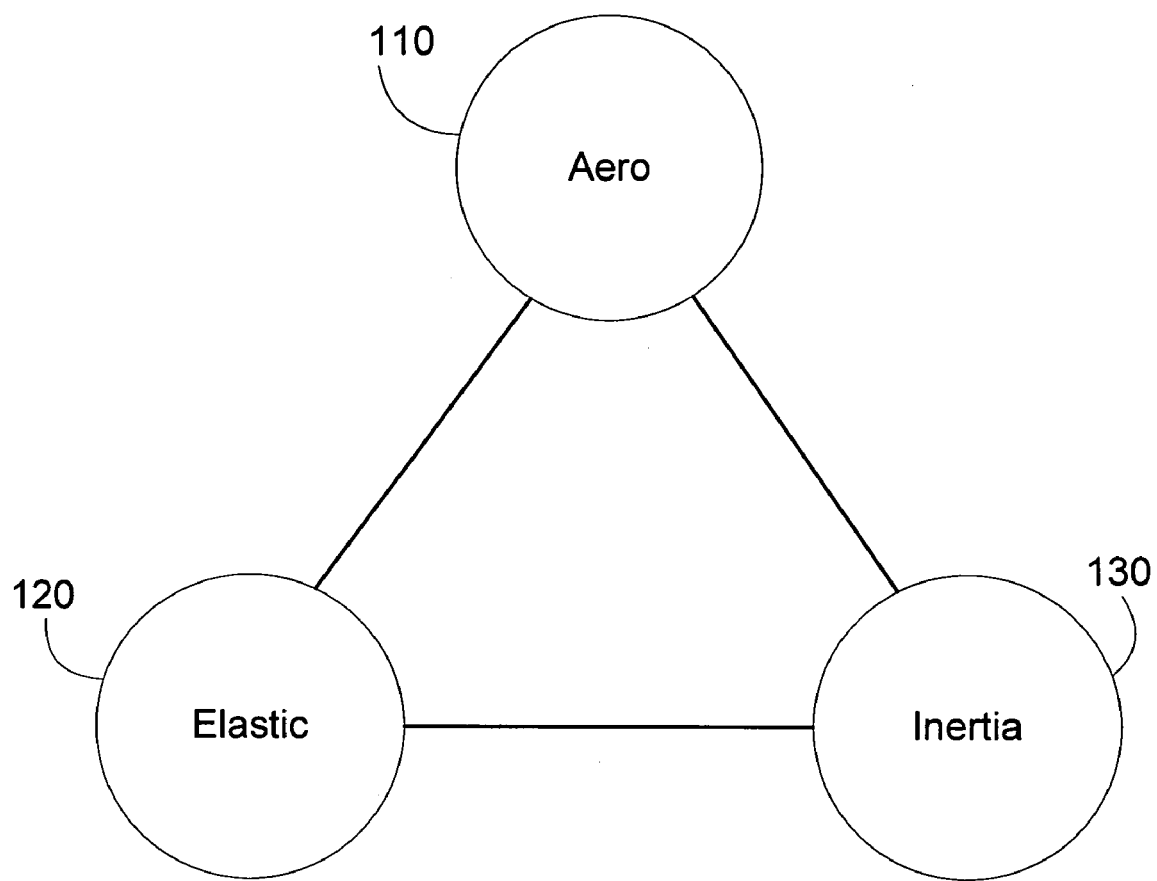
FIG. 1 is a functional block diagram showing parameter relationships in an aeroelastic analysis.

A system and method for performing aeroelastic flutter analysis based in part on a neural network. A structure can be modeled for flutter analysis. The model can resemble a finite element model used for structural analysis. One or more parameters contributing to the flutter characteristics can be defined and constrained. For example, each of the parameters may be constrained to a predetermined range or set. One or more positions or locations on the model can be configured such that one or more of the parameters may be altered at each of the one or more locations.

A set of input parameters can be determined, with input parameters corresponding to at least a subset of available positions on the model. The set of input parameters are used as inputs to a flutter analysis. Results of the flutter analysis for each of the input parameters can be determined using, for example, a finite element structure analysis followed by interpretation of the results in a flutter analysis. The input parameters and corresponding flutter analysis outputs can form a set of input/output pairs.

An artificial neural network can be defined or other wise constructed. The artificial neural network can include an input layer, one or more neurons in a hidden layer, and an output layer. The neurons in the hidden layer can each include a weight, a bias, and a transform function.

The input/output pairs can be used to train the artificial neural network. The neural network can thus be trained to provide an output substantially equal to the output obtained using the finite element model in response to the application of the corresponding input parameters. Thus, application of input parameters corresponding to a specific location in the structure model can result in substantially the same output regardless of whether the finite element model or neural network is used to determine the output.

Once the neural network is trained, it can provide general solutions. The neural network can provide accurate results for input parameters that were not part of the original training set. The neural network can converge to a solution based on the initial training set and may not need to further adjust the values in the neurons. Thus, the values in the neurons in the neural network may be used to generate a module or software that performs a transformation of the input parameters to a flutter solution. The module or software need not perform as a neural network but can provide the transform function that is defined by the neural network. The module or software can be configured such that it may be implemented in a device or apparatus that is accessible at the point of repair. The flutter analysis can then be performed in a relatively short period of time after performing the repair or modification. There can be a shortened period of time between completing a repair or modification and receiving the results of the aeroelastic analysis. The shortened period of time can substantially reduce the costly down period of an aircraft.

Aeroelastic stability of an aircraft structure can be determined when additional mass is added to repair an aircraft structure. The analysis may be of greater interest when the repair is performed on an aircraft surface. FIG. 1 is a prior art functional diagram showing the relationship between three forces that contribute to the flutter of a structure. The three forces include aerodynamic 110, elastic 120 or stiffness, and inertial 130 that is dependent on mass. The flutter analysis may need to be re-determined for a change in any of the three forces. For example, a repair of a structure can change the inertial force 130 when mass is added during the course of the repair.

A set of input parameters can be determined based on the knowledge of the force relationship shown in FIG. 1. A surface repair of an aircraft structure, such as a wing, tail, or stabilizer typically does not affect the aerodynamic forces 110 experienced by the structure. Typically, a repair or modification changes the elastic force 120 or inertial force 130. However, because a repair technician typically does not have the ability to determine changes in elastic force 120, it may not be convenient to define input parameters directed to changes in elastic force 120. Changes in the inertial force 130 can be related to the amount of mass added in the repair and the position of the mass in the structure. Because a repair technician can typically obtain or otherwise discern a mass of the repair and location of the repair, mass and location are typically good candidates for input parameters. Additionally, repair mass and repair locations can be good candidates for input parameters because these are the typical parameters used in a finite element model of the structure.

Figure 2:
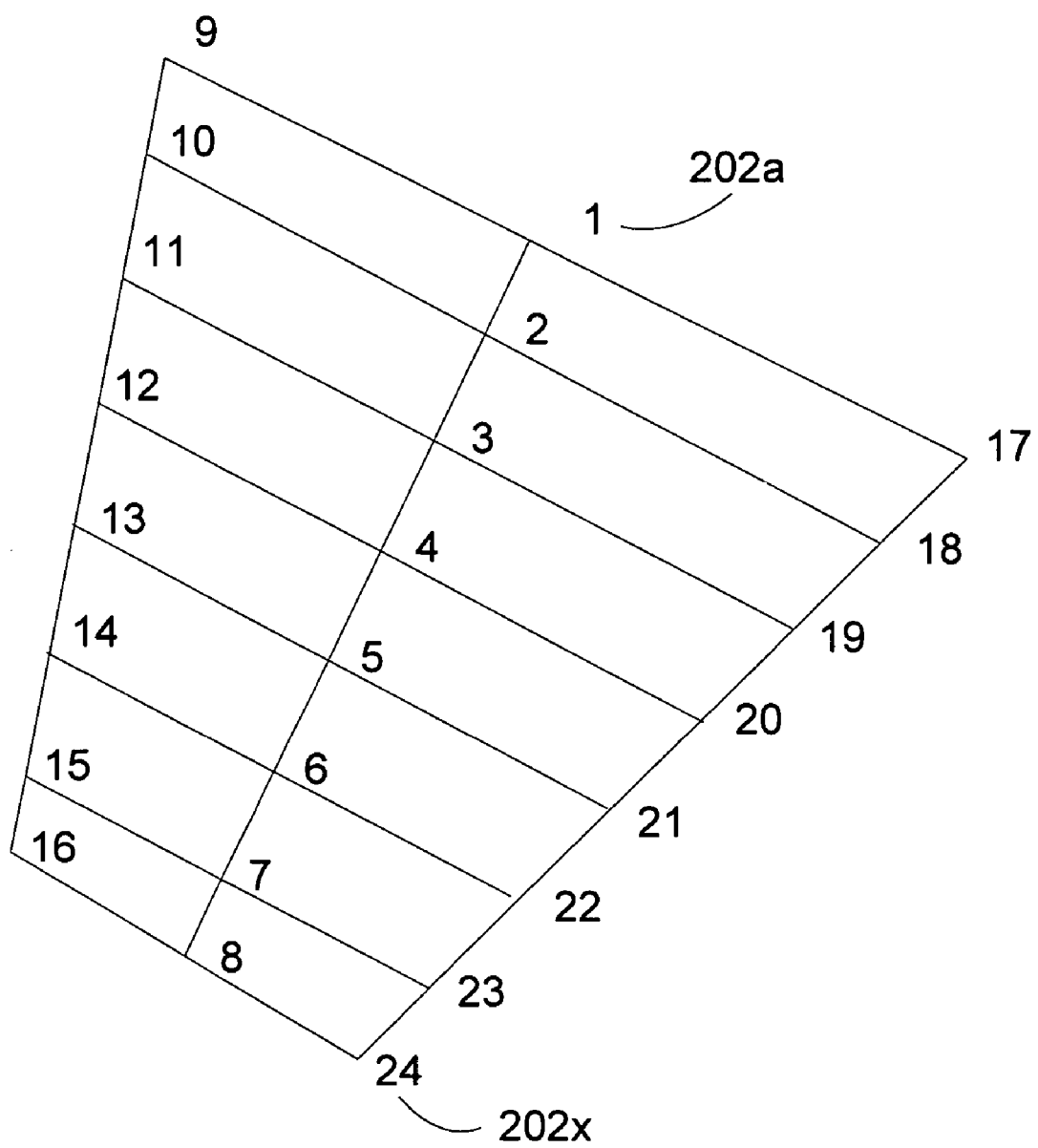
FIG. 2 is an example of a structural model used in aeroelastic analysis.

FIG. 2 is an embodiment of a structural model 200 used in aeroelastic analysis. The structure can be, for example, a stabilizer, wing, elevator, canard, aileron, flap, spoiler, stabilizer, tail section, rudder, and the like, or some other structure.

For the purposes of explanation, the structural model of an aircraft stabilator is shown. The structural model 200 includes a plurality of identified positions, for example 202, which correspond to locations where mass may be added as a result of a repair. Although twenty-four locations are defined in the structural model 200 of FIG. 2, any number of locations may be defined. The actual number of locations used to characterize a structure may be determined based in part on the sensitivity of the structure to mass changes at different locations and the desired sensitivity of system analysis. The positions can be used in the flutter analysis of the disclosure, but are not necessary for the conventional aeroelastic analysis.

In a conventional flutter analysis, a finite element model of the structure is analyzed before and after mass from repairs are added to the structure. In the finite element model, each individual repair made to a surface of the structure can be accounted for in the analysis. The weights and locations of each of the repairs to a structure can be included to a finite element model. The finite element model can be structurally analyzed. The results of the structural analysis can be examined to ensure that the repair weights do not affect the structure in a manner that changes a critical flutter mechanism. In one process, flutter analysis can be performed by generating mode shapes for the structural model 200 for one of the modes contributing to the flutter mechanism.

In the conventional flutter analysis using a finite element model, the structural analysis may take several hours to perform. The finite element model of the repaired structure can be compared to the finite element model of the original non-repaired structure to determine if the two structures behave similarly. If it appears that the repair has not adversely affected the structure, a flutter analysis can be performed.

Figure 3:
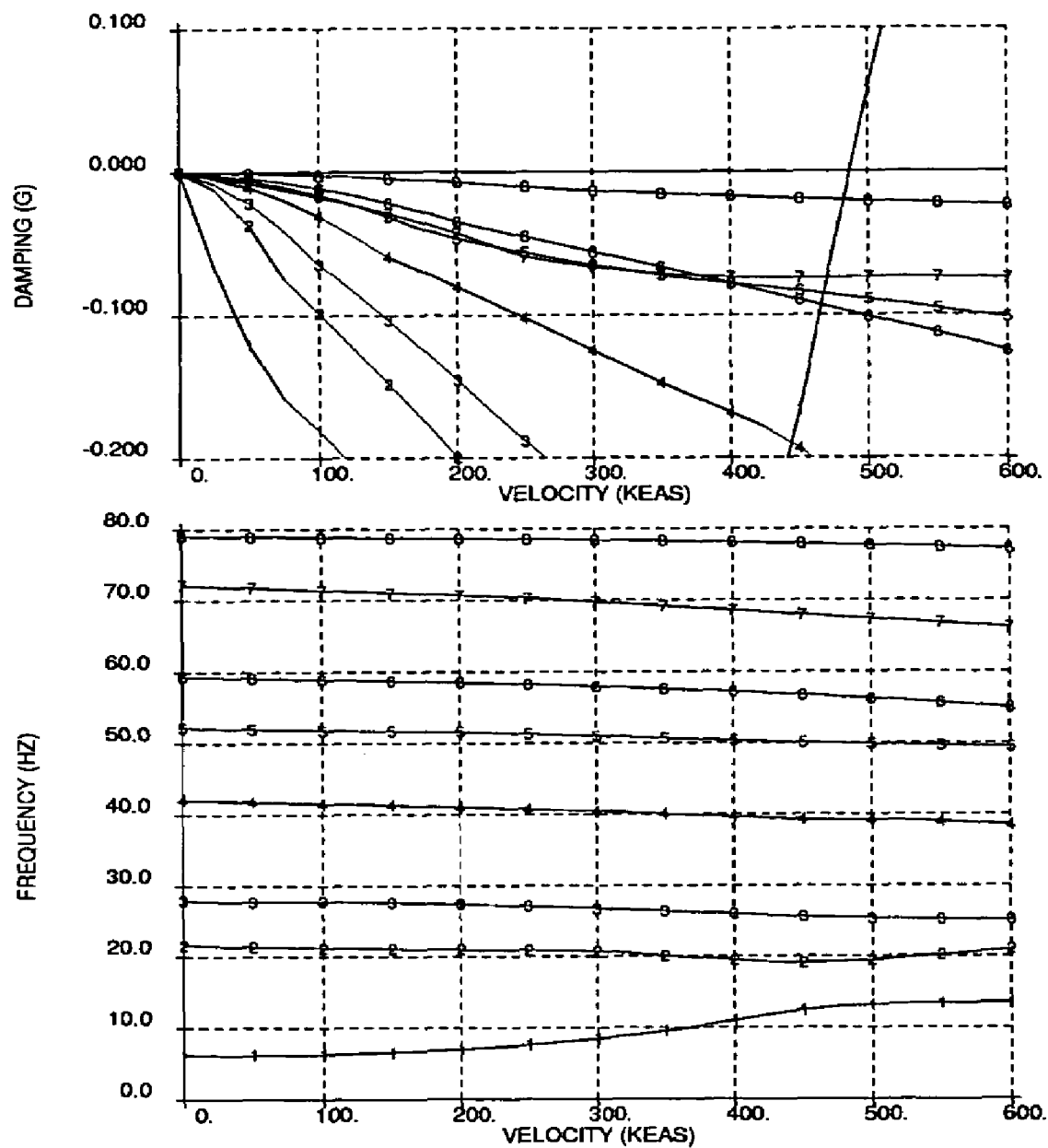
FIG. 3 is an example of aeroelastic analysis performed on a structural model.

A conventional manner of analyzing flutter is to generate a series of V-g-ω curves that characterize the structure. On the V-g-ω curves, frequency and damping are plotted as a function of the velocity. FIG. 3 is an example of a V-g-ω curve generated using the results of a finite element analysis. Each of the modes operates at a frequency that remains relatively constant over a range of velocities. Each of the various modes contribute a curve on the lower plot that corresponds to a damping curve plotted on the upper plot. The point at which the damping curve crosses over the origin identifies the flutter speed and flutter frequency.

In the conventional analysis, an engineer performs the finite element analysis and then generates the series of V-g-ω curves. The engineer then interprets the data in the V-g-ω curves to determine the flutter speed of the repaired structure.

The disclosed aeroelastic analysis system and method does not require the time consuming analysis of the conventional process. However, the disclosed aeroelastic system and method use results obtained from the conventional analysis as training data for a neural network.

Figure 4A:
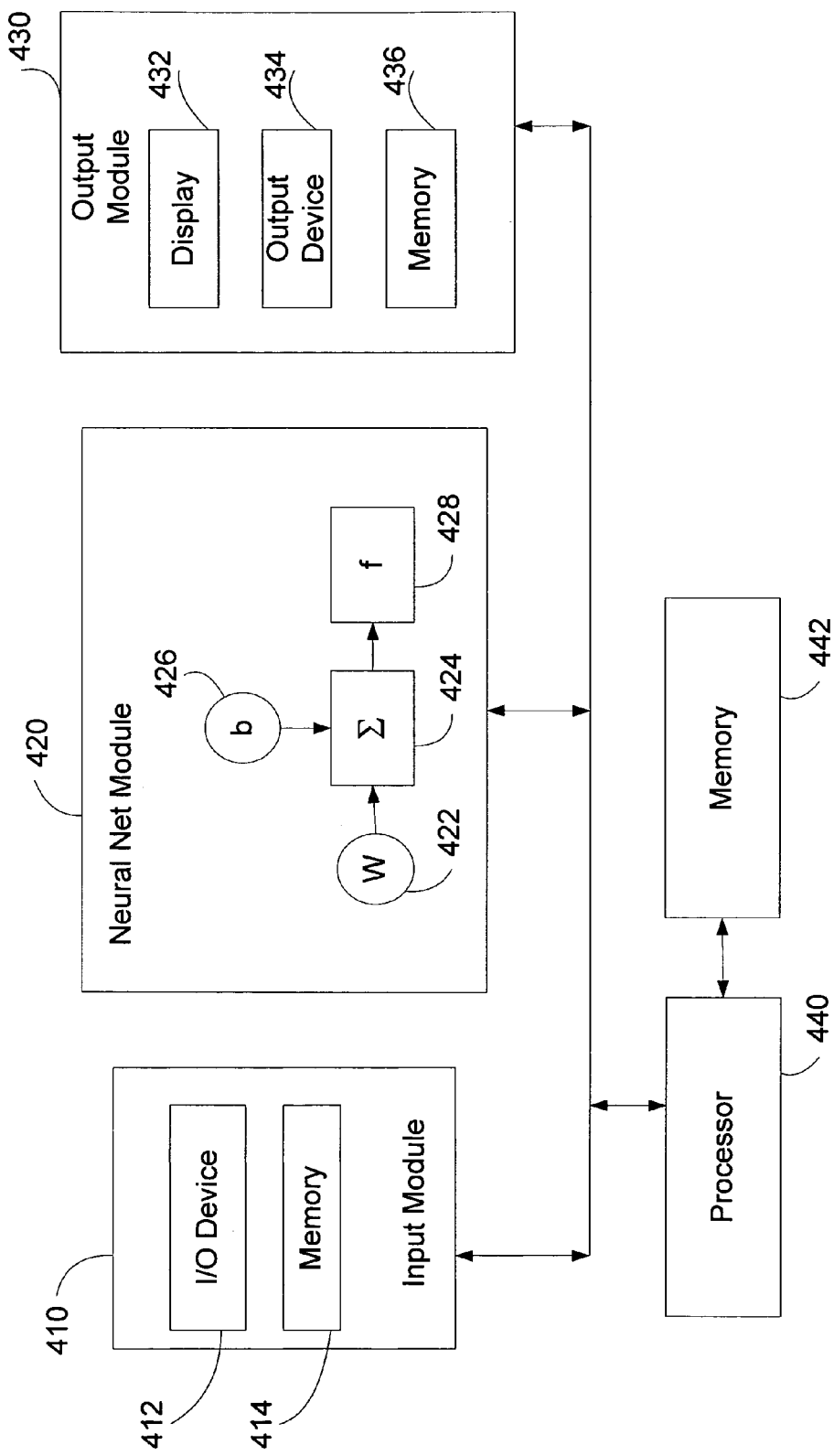
FIGS. 4A-4B are functional block diagrams of an embodiment of a system for performing aeroelastic analysis according to the disclosure.

FIG. 4A is a functional block diagram of a aeroelastic analysis system 400 that can be configured to perform flutter analysis. The system 400 can include an input module 410 coupled to a neural network module 420 that is, in turn, coupled to an output module 430. A processor 440 coupled to memory 442 can be coupled to the input module 410, neural network module 420 and output module 430.

The input module 410 can include an Input/Output (I/O) device 412 and a memory 414. The input module 410 can be configured to receive input parameters that are used in the aeroelastic or flutter analysis. For example, the input module 410 can receive, via the I/O device 412, the weight and position information for repairs made to a particular structure.

The I/O device 412 can be configured to receive the parameters via manual data entry or may receive the parameters via an electronic interface. The I/O module can also be configured to provide an output that confirms receipt of the input parameters. For example, the I/O device 412 can include a display that is configured to echo data that is manually entered to the input module 410.

The I/O device 412 can include, for example, a keyboard, keypad, computer mouse. trackball, buttons, switches, slides, knobs, dials, and the like, or some other device configured to accept manual entry. Additionally or alternatively, the I/O module 412 can include, for example, an electronic port, an electrical connector, a receiver, a wireless receiver, an optical reader, an optical detector, a magnetic reader, a magnetic detector, and the like, or some other assembly for receiving an electronic input.

The input module 410 can receive the input parameters and store them in the associated memory 414. In other embodiments, the input module 410 can store the received input parameters in the centralized memory 442. In still other embodiments, the input module may provide the received input parameters to the neural network module 420 as they are received.

The neural network module 420 can be configured as a neural network having a predetermined number of neurons and one or more predetermined transfer functions. Configuring the neural network module 420 with a neural network can be particularly advantageous when training the neural network to converge on a solution. In another embodiment, the neural network module 420 is configured to implement a non-linear transfer function implemented by a neural network trained using a predetermined training set of input and output data. In such an embodiment, the neural network module 420 is not configured as a neural network but instead, performs substantially the transform function of a previously trained neural network.

An embodiment in which the neural network module 420 is configured to perform substantially the transfer function of a previously trained neural network can be advantageous for implementations of the system 400 in devices having relatively low computational power. A first flutter analysis system 400 can be configured with a neural network. The neural network can be trained with a training set of data. Then the transfer function of the trained neural network can be implemented in the neural network module to provide the transfer function of the neural network without the need to actually implement a neural network.

However, regardless of whether the neural network module 420 implements a neural network or a transfer function of a trained neural network, it is convenient to model the neural network model in terms of the trained neural network. Thus, the neural network module 420 can include a weight vector module 422 coupled to a input of a summer 424. In one embodiment, the weight vector module 422 can be the same dimension as the input parameters. In another embodiment the weight vector module 422 can be the same dimension as the number of neurons in the neural network. The weight vector module 422 can be configured to multiply the input parameters by a weighting vector to weight the input parameters prior to summing and passing through the transfer function.

A bias module 426 can be coupled to another input to the summer 424. The bias module 426 can be configured to provide a vector or a scalar bias value to the summer. The summed output can be coupled to a transfer function module 428.

The transfer function module 428 is typically a predetermined nonlinear transfer function, although linear transfer functions may also be used. In one embodiment, the transfer function implemented in the transfer function module 428 is a sigmoid function. In other embodiments, the transfer function can include a tangent sigmoid, a hyperbolic tangent sigmoid, a logarithmic sigmoid, a linear transfer function, a saturated linear transfer function, a radial basis transfer function, and the like, or some other type of transfer function.

The output module 430 can include a display 432, another output device 434, and can include memory 436. The output device 434 can be an electronic output interface. For example, the output device 434 can be a electrical connector, a communication device, a communication port, a modem, an optical transmitter, a wireless transmitter, a display driver, and the like, or some other device for outputting results.

The display 432 can be configured to output the results received from the neural network module 420. In one embodiment, the display 432 can be configured to output a flutter speeds and flutter frequency for a number of damping factors. In another embodiment, the display can be configured to output a graph, list, or plot of aeroelastic analysis data.

The memory 436 in the output module 430 can be configured to store one or more outputs of the neural network module 420 for output in a single file, list, or graph. For example, the memory 436 can be configured to store a number of data points for plotting on a graph that is shown on the display 432. In other embodiments, the output module 430 can use the shared memory 442.

The shared memory 442 and processor 440 can be configured to operate in conjunction with the modules. In an embodiment of the system 400, the processor 440 and memory 442 can be configured to perform one or more of the functions of the modules 410, 420, and 430. For example, one or more functions performed by the modules can be configured as processor readable instructions stored in memory 442 and executed by the processor 440. In one embodiment, the neural network function is configured as a number of processor readable instructions stored in memory 442 and executed by the processor 440.

The memory 442 can be a single storage device or may be multiple storage devices. Similarly, the processor 440 can be a single processor or can be a plurality of processors.

Figure 4B:
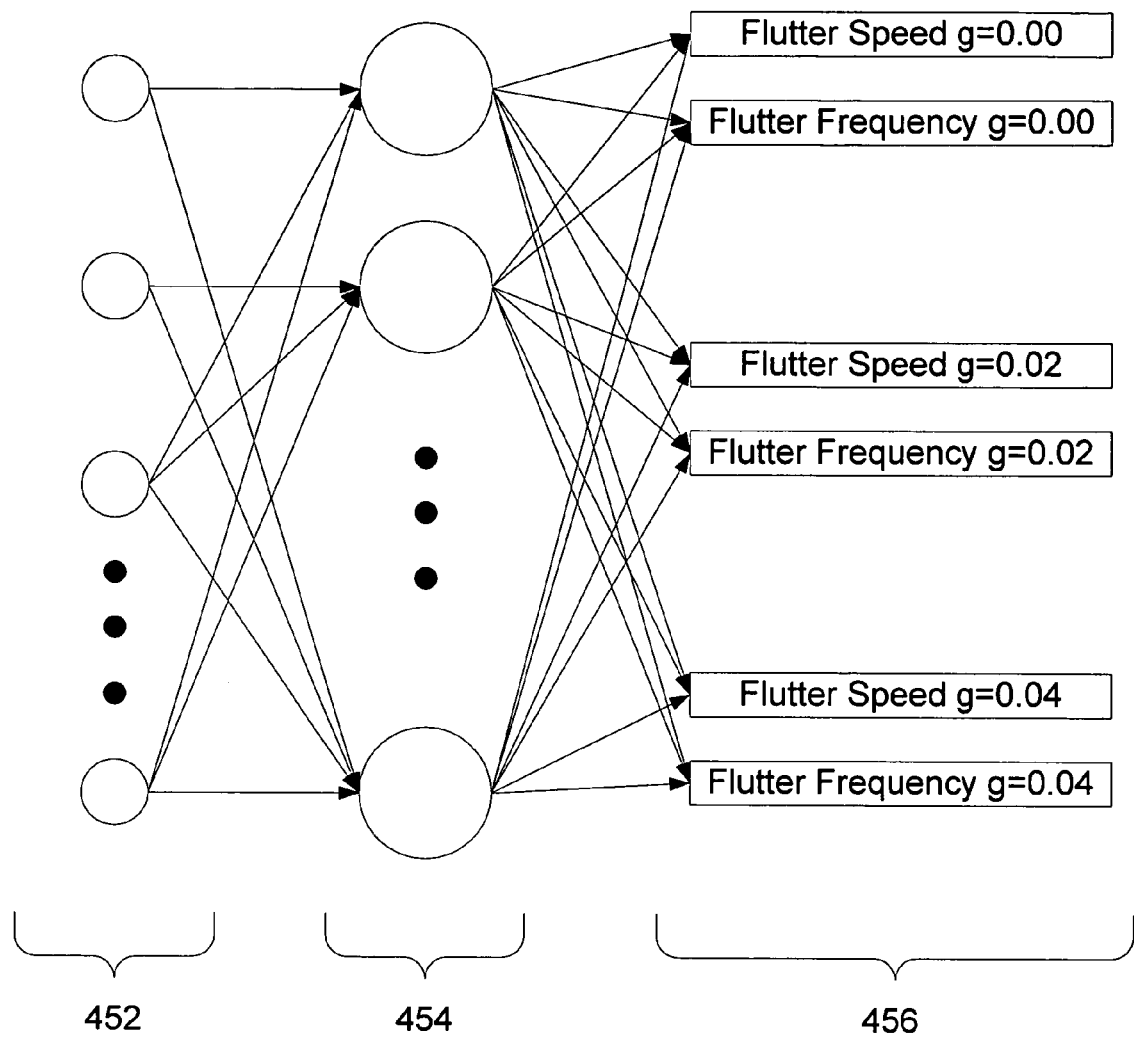

FIG. 4B is a functional block diagram of an embodiment of a neural network 450 that may be implemented in the neural network module 420 of FIG. 4A. The neural network 450 includes an input layer 452 coupled to a neuron layer 454. the output of the neuron layer 454 can be coupled to an output layer 456. Although the neural network 450 includes a single neuron layer, other embodiments can include a plurality of neuron layers disposed between the input layer 452 and the output layer 456. Although a feed forward neural network 450 is shown in FIG. 4B, the neural network 4B may have any type of architecture and is not limited to a feed forward architecture.

In the embodiment shown in FIG. 4B, the neural network 452 includes an input layer that can be configured to accept a multiple dimensional input signal that includes the weight of a repair and the location of the repair on the modeled structure. The neuron layer 454 can include a number of neurons. Each neuron can have an associated weight vector and bias. The number of neurons in the neuron layer 454 can correspond to the dimension of the output layer 456. Each neuron in the neuron layer 454 can, for example, determine an output value for the flutter analysis. For example, a neuron may be configured to determine a flutter speed or a flutter frequency for a particular damping factor.

In one embodiment, the neural network 450 can be configured to generate a flutter analysis for an aircraft structure and can be configured to provide the flutter speed and flutter frequency for a number of damping factors. The neural network 450 can comprise a single layer, feed forward neural network. The neurons can each be configured to implement a hyperbolic tangent sigmoid function.

The network can be trained using a known set of flutter results. The input layer 452 can be configured to receive the input parameters that include the weight and locations of repairs made to the aircraft structure. The neural network can be trained with the known results of the training set until an error in the results of the neural network is less than a predetermined amount. The architecture of the neural network can, through the iterative training process, attempt to minimize a mean square error. The neural network can be characterized as converging on a solution when the error produced by the neural network is less than a predetermined error limit.

Figure 5:
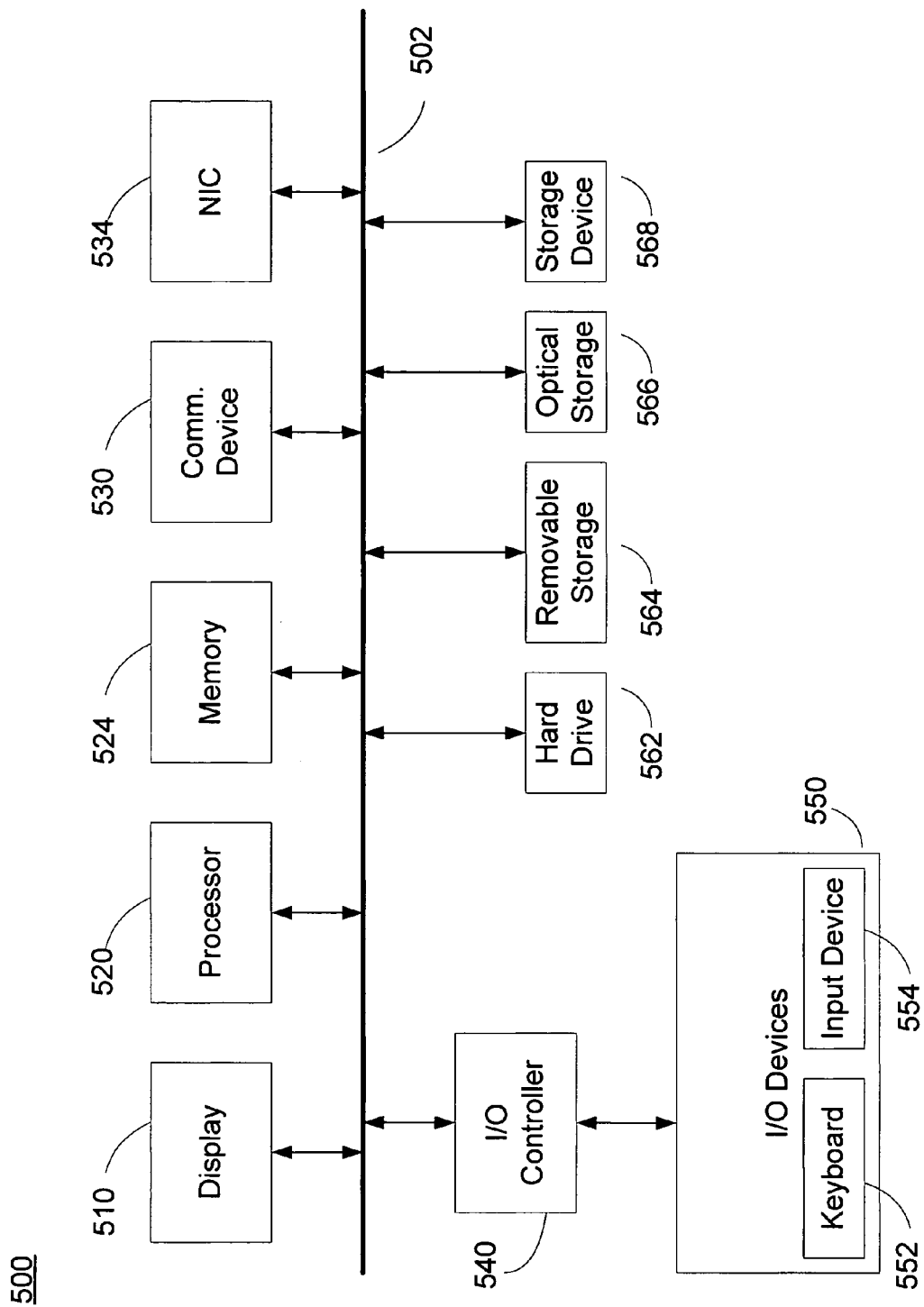
FIG. 5 is a functional block diagram of an embodiment of a computer that can be configured to perform aeroelastic analysis in accordance with the disclosure.

As described earlier, one or more of the modules in the aeroelastic analysis system can be implemented as software executed by a processor. FIG. 5 is functional block diagram of an embodiment of a computer 500 that can be configured to perform a portion or all of one or more of the modules in the aeroelastic analysis system. The computer 500 can include a display 510, I/O devices 550 including a keyboard 552 and an input device 554, a processor 520, memory 524, an I/O controller 540, a hard drive 562, one or more removable storage drives 564, which can include a floppy drive, an optical storage 566, some other storage devices 568, a communication device 530 such as a modem, and a network interface card (NIC) 534. The various elements can be coupled using one or more computer busses 502 within the computer 500. The one or more storage devices 568 can include, but are not limited to, ROM, RAM, non-volatile RAM, flash memory, magnetic storage, optical storage, tape storage, hard disk storage, and the like, or some other form of processor readable media for storing data, instructions, or a combination of data and instructions.

Figure 6A:
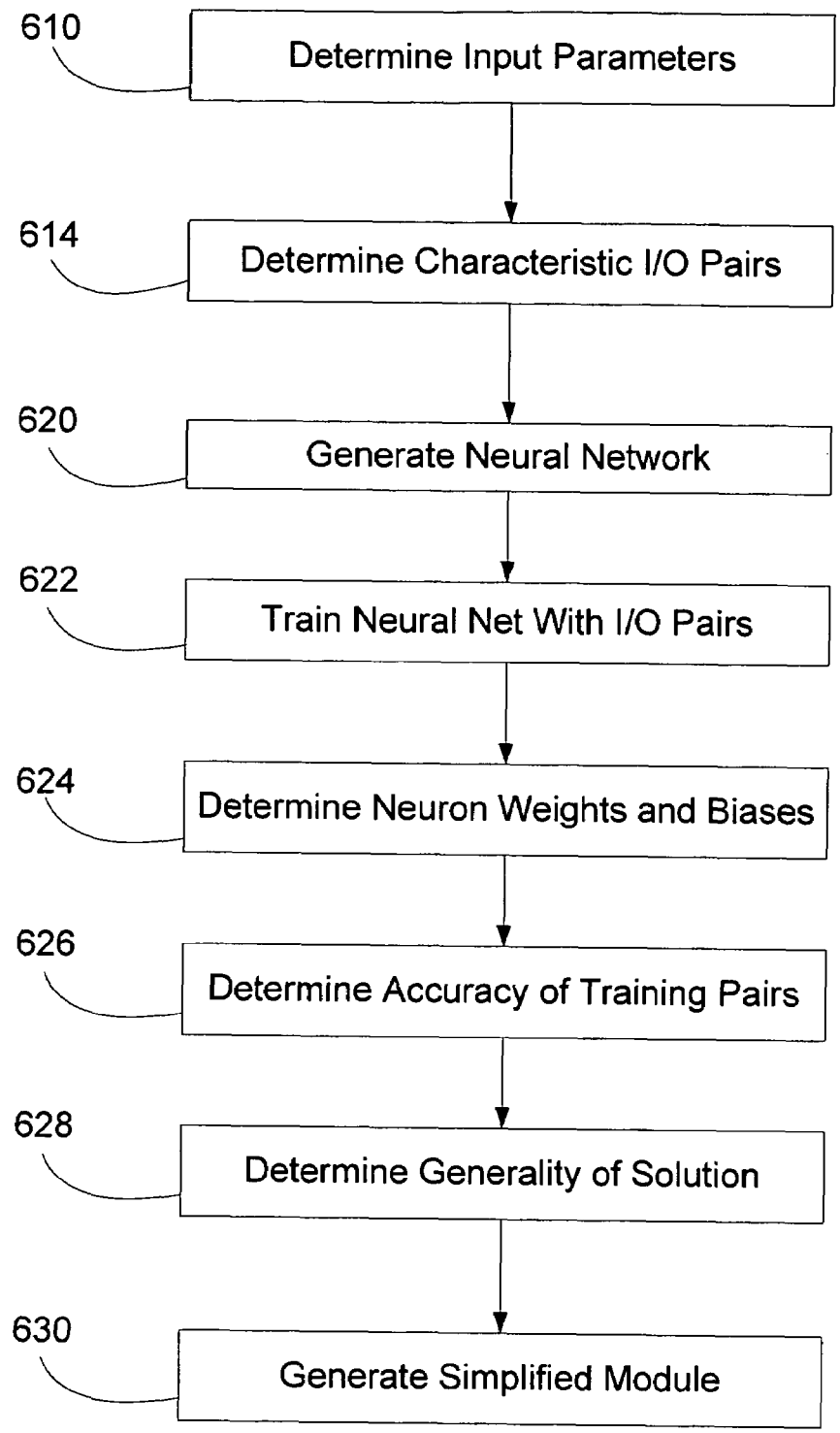
FIGS. 6A-6C are flowcharts of processes used in performing aeroelastic analysis.

FIG. 6A is a flowchart of an embodiment of a method 600 of performing aeroelastic analysis. The method 600 can be implemented, for example, in designing a system for use in the system 400 of FIG. 4A, the computer 500 of FIG. 5, or a combination of the two.

The method 600 begins at block 600 where an engineer or other system designer determines one or more input parameters. For example, in an artificial neural network used to predict flutter speeds and flutter frequencies for a lifting surface that was changed by repairs or modifications, it may be assumed that the stiffness of the surface has not changed. Thus, the mass and locations of the mass may be the parameters that are accounted for in the analysis. The input parameters may be further constrained such that the initial assumption that the change does not affect stiffness remains accurate. In one embodiment, the locations of the repairs or modifications were constrained to the locations illustrated in the structural model of FIG. 2. Additionally, the repair or modification weights were constrained to no greater than a maximum weight of 10% of the total weight of the structure. In an example where the structure is an aircraft stabilator weighing three hundred pounds, the weights of the repairs are constrained to not exceed thirty pounds.

Once the input parameters are defined, the engineer can proceed to block 614 and determines a training set of characteristic pairs. The neural network is trained according to the characteristic I/O pairs. Thus, the engineer can generate one or more input parameters and the resultant outputs for those inputs. Thus, the engineer may generate a number of weights and locations corresponding to hypothetical repairs. The engineer can then determine the flutter analysis results for the input parameters using, for example, a conventional analysis method such as a finite element model and V-g-ω plots.

After determining the characteristic I/O pairs, the engineer can proceed to block 620 and generate a neural network. For example, the engineer may generate a feed forward neural network where the neurons use a hyperbolic tangent sigmoid as the transfer function.

After the neural network is generated, the engineer can proceed to block 622 and train the neural network using the characteristic I/O pairs. The neural network can be trained with a predetermined number of characteristic I/O pairs, or the neural network may be trained until an error in the result generated by the network is below a predetermined error level. For example, the neural network can be trained until the mean square error is below a predetermined error threshold.

After training the neural network, the engineer can proceed to block 626 and determine the weight vectors and bias values that are implemented in the converged neural network. The engineer can proceed to block 626 and verify the accuracy of the neural network, for example, by providing input parameters to the neural network for which the results are known. The known results can be compared to the output from the neural network to determine the accuracy of the output.

The engineer can proceed to block 628 and determine the generality of the solution by providing input parameters to the neural network that were not part of the initial training set. The engineer can compare the expected results against the results output by the neural network. If the neural network demonstrates satisfactory generality, the process may be complete and subsequent inputs may be provided to the neural network and the results obtained from the neural network.

However, once the neural network is trained, continued use of a neural network is not required. The engineer can proceed to block 680 and generate a simplified module that performs the transfer function characterized by the weight and bias values of the trained neural network. The transfer function of the neural network can be implemented, for example, in a hand held device, or some other type of computing device that can be used by a repair technician to verify the aeroelastic analysis of a repaired structure.

Figure 6B:
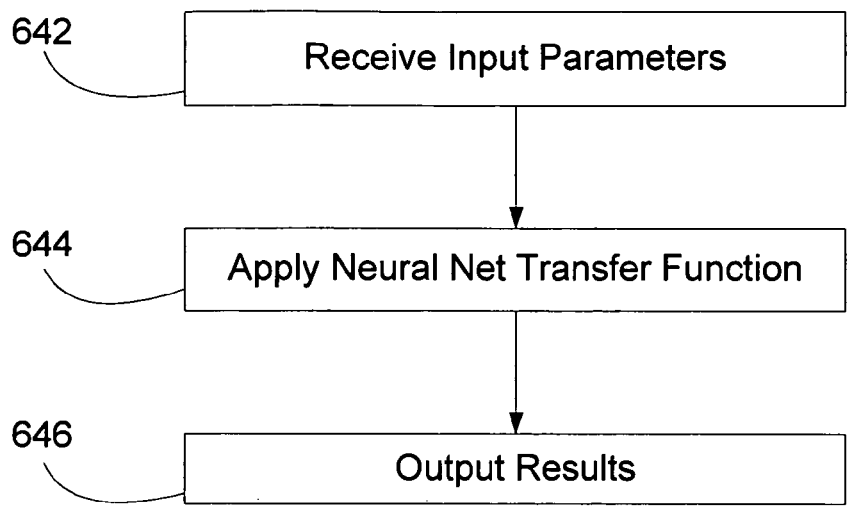

FIG. 6B is a flowchart of a method 640 that can be implemented, for example, by the system 400 of FIG. 4A, the computer 500 of FIG. 5, or some combination of the two.

The method 640 begins at block 642 where the system receives input parameters. The system can receive the input parameters, for example, using an input module that accepts user inputs of weights and locations of the weights. The system can then proceed to block 644 and apply the neural network transfer function to the input parameters to produce an output that is substantially equal to the output that is produced by a trained neural network. The system can, for example, implement a neural network or can emulate the transfer function of the neural network. The system then proceeds to block 646 and outputs the results. The results can be output, for example, using a display or other output device.

Figure 6C:
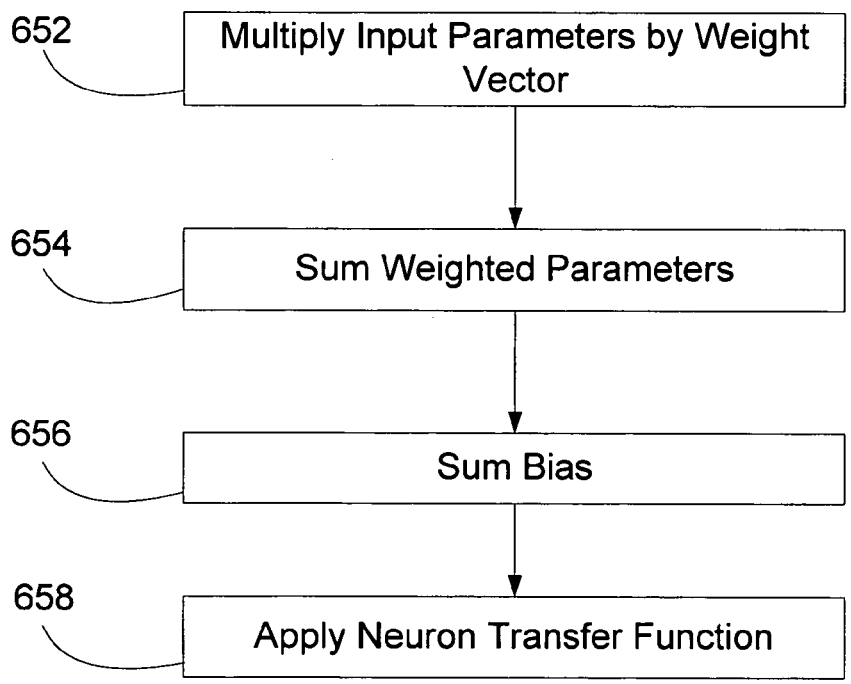

FIG. 6C is a flowchart of a method 644 of applying a neural network transfer function to input parameters, such as described in the method of FIG. 6B. The method 644 begins at block 652. The system multiplies the input parameters by the weight vector of the trained neural network. The system then proceeds to block 654 and sums the weighted input parameters. The system then proceeds to block 656 and sums an additional bias value to the sum of the weighted input parameters. In some embodiments, the bias value may be zero. In other embodiments, the bias value is non-zero. After computing the entire sum, the system can proceed to block 658 and apply the sum to the neuron transfer function. Note that the neuron transfer function referred to in block 658 represents the transfer function implemented in a neuron of the neural network and does not refer to the transfer function of the entire neural network referred to in the flowchart of FIG. 6B.

Figure 7:
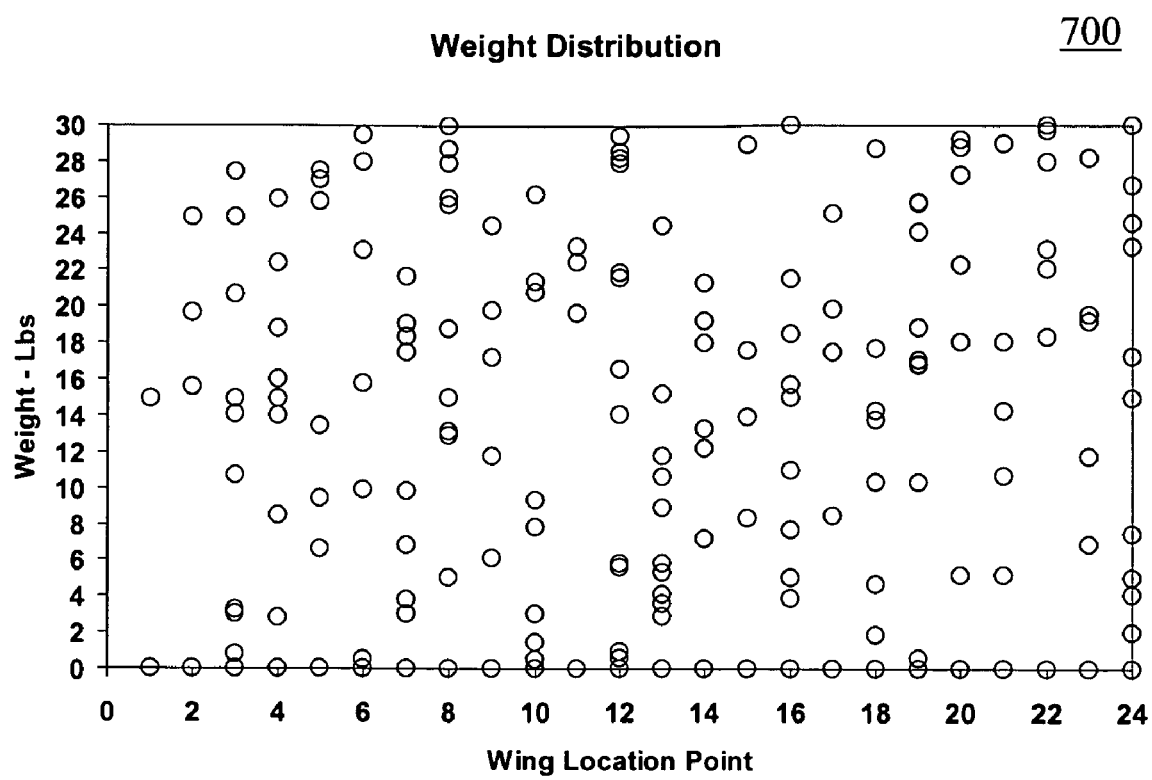
FIG. 7 is a graph of example input parameters generated using a random process.

FIG. 7 is a graph 700 of example input parameters generated using a random process. The graph 700 shows a number of weights and locations of hypothetical or actual repairs or modifications. The input parameters can be used as the input parameters for the characteristic I/O pairs used to train the neural network. For each input parameter example, a conventional aeroelastic analysis can be performed to generate a result. The input parameter and conventional result are used as a single I/O pair in the set of characteristic I/O pairs used to train the neural network. As seen in the graph 700, at least one training pair is generated corresponding to each location on the structural model.

The input parameters for the training set can be generated randomly, as shown in the graph of FIG. 7, or may be generated to uniformly cover the design space or provide some other distribution over the design space.

Figure 8:
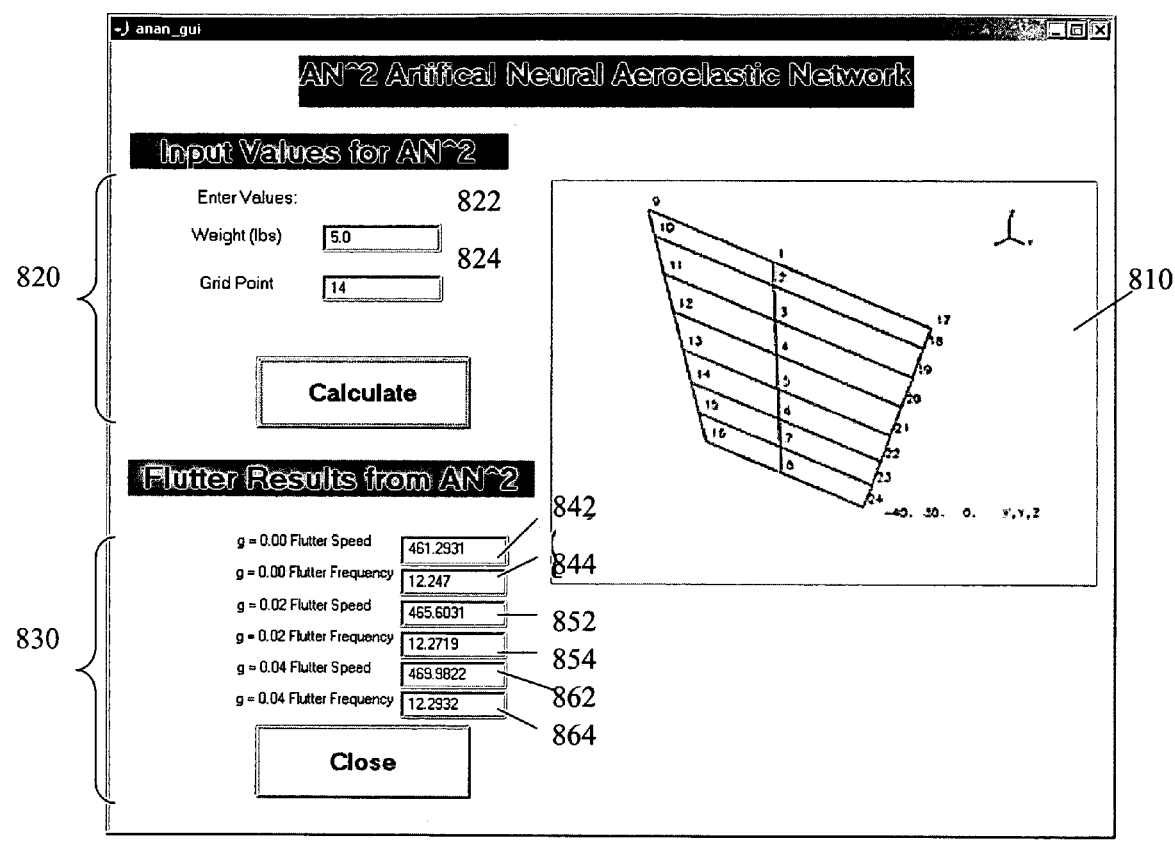
FIG. 8 is a screen image of an embodiment of an aeroelastic analysis user interface.

FIG. 8 is an embodiment of a screen image of an aeroelastic analysis user interface 800. The user interface 800 can be, for example, implemented as part of the input module 410 and output module 430 of the system shown in FIG. 400. The user interface 800 can include a structural model window or display 810 that displays or otherwise provides the structural model, showing the locations and reference identifiers for a number of input parameters. In the user interface 800 of FIG. 8, the structural model window 810 shows a structural model of a stabilator. The structural model includes a number of reference numbers indicating the possible locations for weight to be added to the structure.

An input Window 820 or input section to the user interface 800 can include one or more fields configured to accept user input. For example, the input window 820 includes a first field 822 configured to accept a weight value. The input window 820 also includes a second field 824 configured to accept a grid point value corresponding to one of the reference locations identified in the structural model shown in the structural model window 810.

Although the input fields are shown as open fields that are to be filled by a user, the fields can be configured as drop down menus or some other type of entry. A limited entry filed may be advantageous for fields that have a limited number of possible values such as, for example, as the grid point input field.

The user interface 800 can also include an output Window 830 or output section that can include one or more fields configured to present results to the user. In the embodiment shown in FIG. 8, the output window includes fields that provide the flutter speed and flutter frequency for three different damping values. The output values can be determined based in part on the values provided in the input fields.

The embodiment of FIG. 8 includes six output fields. A first pair of output fields, 842 and 844, is configured to provide the flutter speed and flutter frequency for a 0.00 damping value. A second pair of output fields, 852 and 854, is configured to provide the flutter speed and flutter frequency for a 0.02 damping value. A third pair of output fields, 862 and 864, is configured to provide the flutter speed and flutter frequency for a 0.04 damping value.

Figure 9:
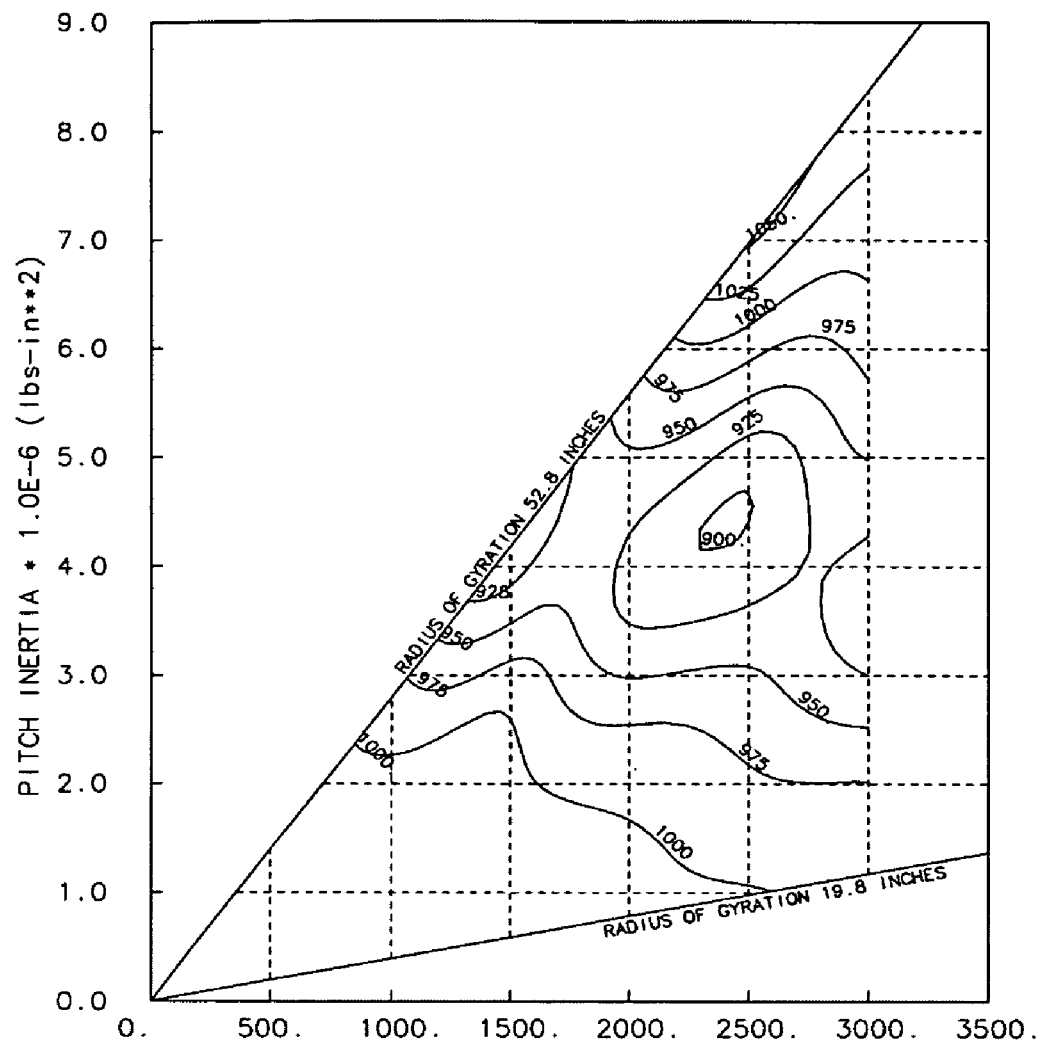
FIG. 9 is an example of a contour plot generated using aeroelastic analysis.

The user interface 800 is not limited to providing numerical output. FIG. 9 is an example of a contour plot generated using aeroelastic analysis. The user interface 800 can be configured to provide the contour plot 900 in response to user input. The contour plot is an example of a plot of flutter speeds as a function of weight and pitch inertia. The aeroelastic analysis system can be configured to output other analysis results including, but not limited to, control surface buzz, ejection store loads, flight flutter testing, and the like, or some other analysis.

Figure 10A:
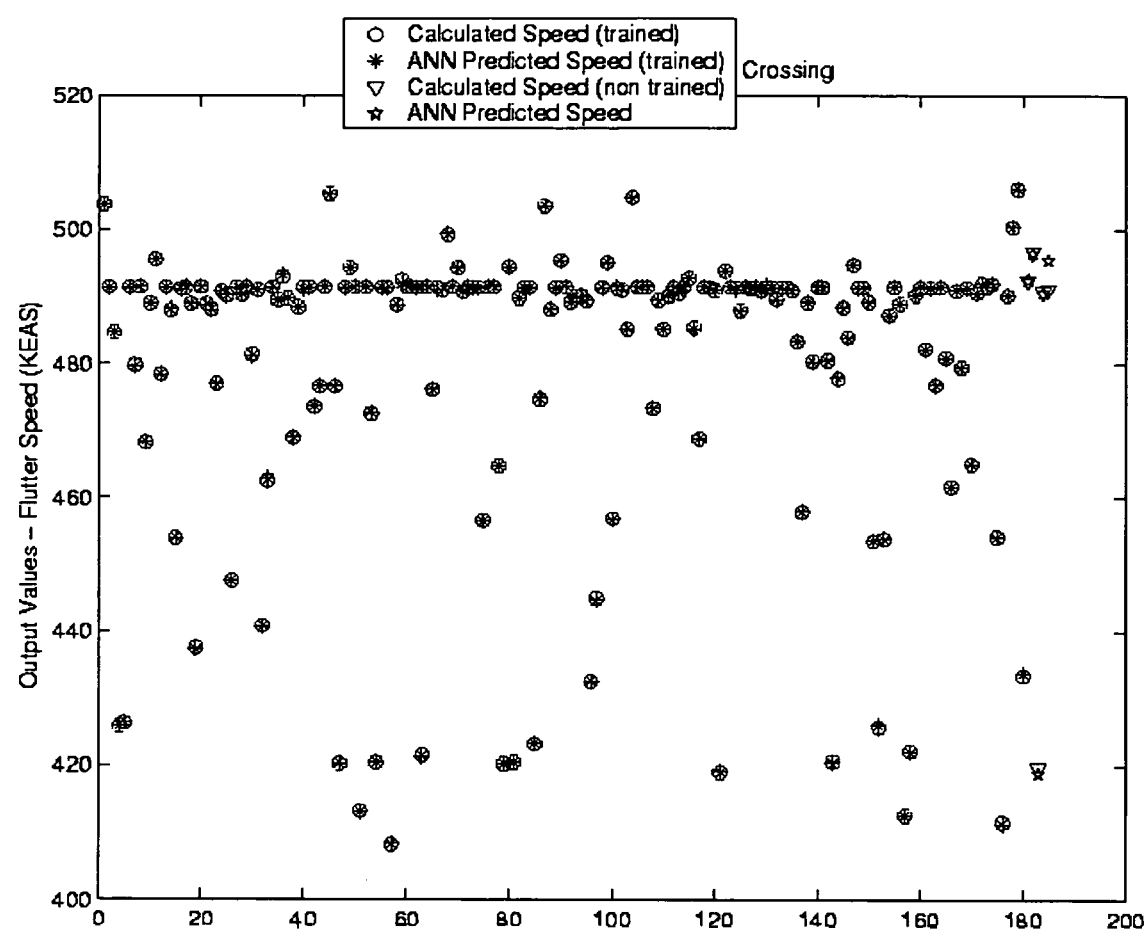
FIGS. 10A-10B are graphs of examples comparing aeroelastic analysis performed according to the disclosure against the same analysis performed using initial finite element model structural analysis.
Figure 10B:
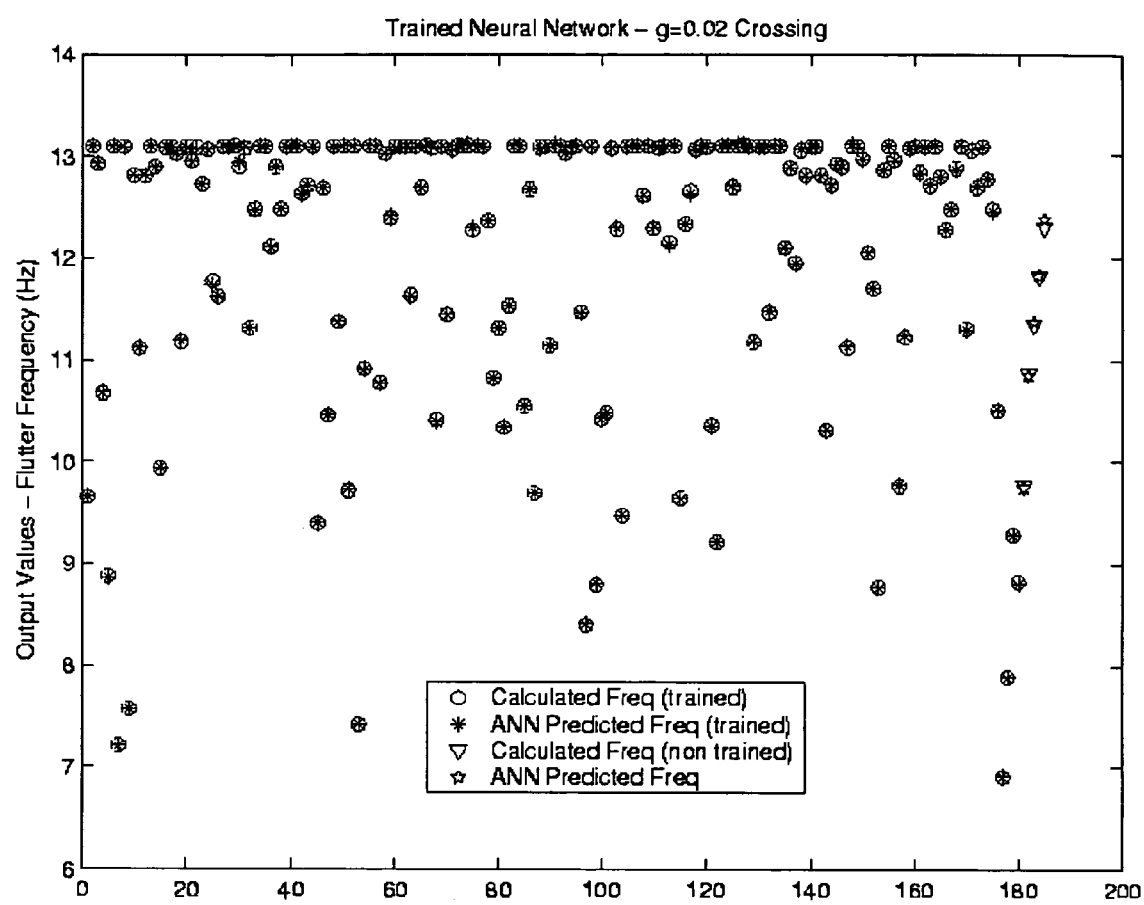

FIGS. 10A-10B are graphs comparing aeroelastic analysis performed according to one embodiment of the disclosure against the same analysis performed using initial finite element model structural analysis. In FIG. 10A, the flutter speeds for a 0.02 damping value calculated according to the finite element model plotted and compared against the flutter speeds determined using a neural network based flutter analysis. FIG. 10B is graph of the flutter frequency for a 0.02 damping value calculated according to the finite element model plotted and compared against the flutter frequency determined using a neural network based flutter analysis. As can be seen from the two graphs, the flutter frequency determined using the two methods are comparable.

Figure 11:
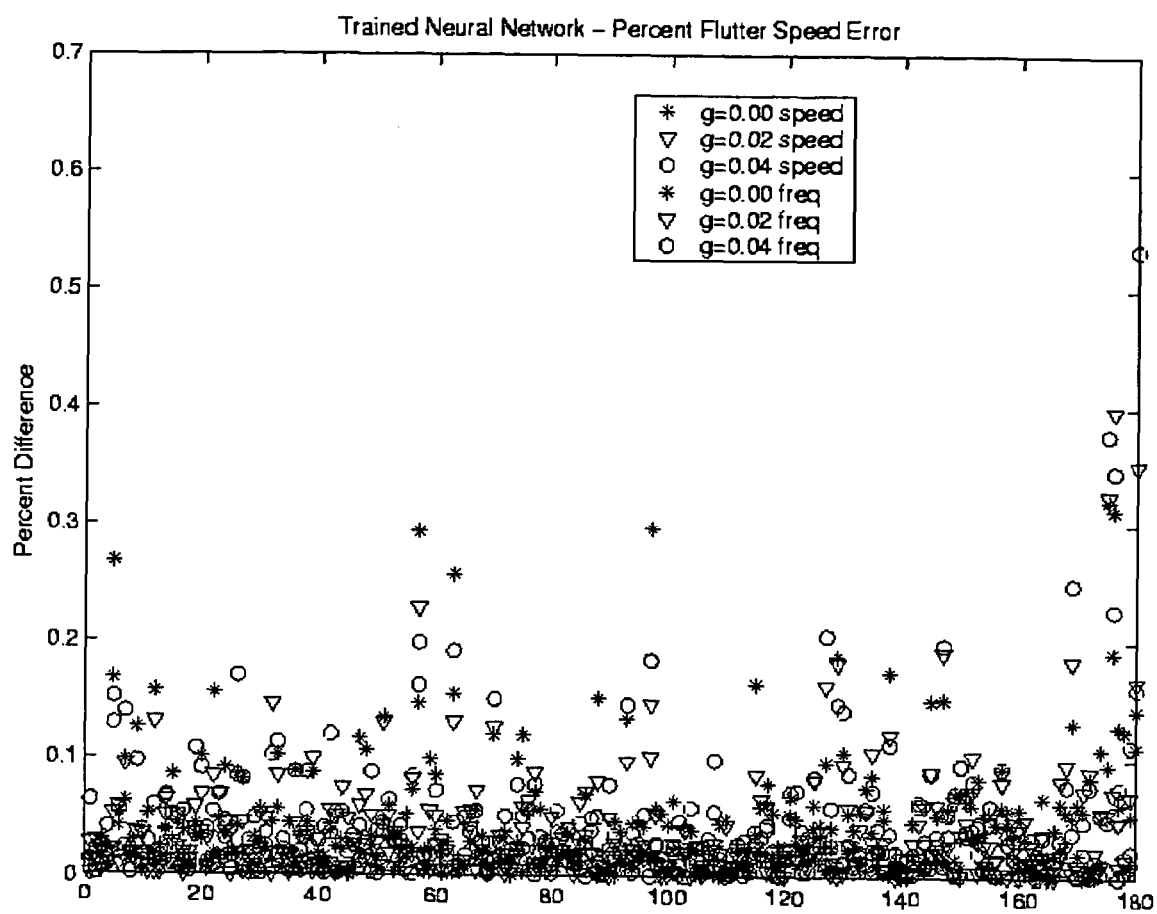
FIG. 11 is a graph of error in calculated and predicted aeroelastic characteristics.

FIG. 11 is a graph of percentage error in flutter speeds calculated according to the finite element method and flutter speeds determined using a neural network based aeroelastic analysis. Over the entire design space, the maximum error exhibited is less than 1%. Because conventional aeroelastic analytical results may differ from actual results by greater than 1%, the level of error may be acceptable.

An artificial neural network based aeroelastic analysis system and method are thus disclosed. The system allows aeroelastic analysis to be accurately performed in a fraction of the time used for finite element modeling and V-g-ω analysis. Timely aeroelastic analysis can reduce the downed aircraft time and costs typically associated with performing extended aeroelastic analysis. In addition to reducing the time required to perform the actual numerical analysis, the system decreases a time required for an aeroelastician to analyze repairs. The system may be used by the repair technician to analyze aeroelastic effects of the repair, and an engineer would not need to spend any time if the results from the system indicate that the repair has little or substantially no effect on flutter speeds. The system does not replace aeroelastic analysis, but instead provides an additional tool for performing the analysis. The aeroelastic analysis process can be simplified to allow non-aeroelastic engineers to produce accurate flutter speed determinations that can be used to make a flight certification decision.

An artificial neural network can be generated to perform the aeroelastic analysis. In one embodiment, the artificial neural network can be configured to determine flutter speeds and associated flutter frequencies for aircraft structures. The structure is modeled and the model is used to determine one or more input parameters to be used by the neural network. The artificial neural network can be trained with a set of training data having one or more I/O characteristic pairs.

The trained neural network, or a system or apparatus that emulates the trained neural network, can be implemented in a system for use by repair personnel. The system can include an input module configured to receive one or more input parameters. The system can also include an output module to present one or more aeroelastic analysis results that are generated, based at least in part, on the input parameters.

The above description of the disclosed embodiments is provided to enable any person skilled in the art to make or use the disclosure. Various modifications to these embodiments will be readily apparent to those skilled in the art, and the generic principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. An aeroelastic analysis system for analyzing flutter relating to a completed repair of a structure, the system comprising:
   an input module configured to receive one or more input parameters associated with aeroelastic flutter characteristics of a structure, the one or more input parameters relating to a completed repair of the structure; and
   a neural network module coupled to the input module, and configured to generate a transformation of the one or more input parameters to produce at least one aeroelastic flutter analysis result, the transformation based in part on a trained neural network, wherein the at least one aeroelastic flutter analysis result comprises at least one of a flutter frequency and a flutter speed for determining whether the aeroelastic flutter characteristics of the structure with the completed repair are acceptable.

2. The system of claim 1, further comprising an output module coupled to the neural network module, and configured to output the at least one aeroelastic flutter analysis result.

3. The system of claim 1, wherein the input module comprises at least one input/output (I/O) device selected from the group comprising a keyboard, a keypad, a computer mouse, a trackball, a button, a switch, a slides, a knobs, and a dial.

4. The system of claim 1, wherein the input module comprises at least one input/output (I/O) device selected from the group comprising an electronic port, an electrical connector, a receiver, a wireless receiver, an optical reader, an optical detector, a magnetic reader, and a magnetic detector.

5. The system of claim 1, wherein the one or more input parameters comprise:
   a weight; and
   a location of the weight on the structure.

6. The system of claim 1, wherein the neural network module comprises:
   a weight vector module configured to multiply the one or more input parameters by a weighting vector to generate one or more weighted parameters;
   a bias module configured to provide a scalar bias value;
   summer coupled to the weight vector module and the bias module and configured to output a sum of the one or more weighted parameters and the bias value; and
   transfer function module coupled to the summer and configured to apply a transfer function to the sum.

7. The system of claim 6, wherein the transfer function comprises a non-linear transfer function.

8. The system of claim 6 wherein the transfer function comprises a tangent sigmoid function.

9. The system of claim 6, wherein the transfer function comprises at least one function selected from the group comprising a sigmoid, a hyperbolic tangent sigmoid, a logarithmic sigmoid, a linear function, a saturated linear function, and a radial basis function.

10. The system of claim 1, wherein the at least one aeroelastic flutter analysis result comprises the flutter frequency at a damping value.

11. The system of claim 1, wherein the at least one aeroelastic flutter analysis result comprises the flutter speed at a damping value.

12. The system of claim 1, wherein the at least one aeroelastic flutter analyses result comprises the flutter frequency and the corresponding flutter speed at a damping value.

13. The system of claim 1, wherein the at least one aeroelastic flutter analysis result comprises a contour plot of store loads.

14. A computer-implemented method of performing aeroelastic flutter analysis to determine the aeroelastic flutter characteristics from one or more completed repairs performed on a structure, the computer-implemented method comprising:
   a processor determining input parameters relating to one or more completed repairs performed on a structure;
   the processor determining a training set of characteristic I/O pairs;
   the processor generating a neural network;
   the processor training the neural network using the training set to generate a trained neural network;
   the processor determining aeroelastic flutter characteristics of the structure based in part on the trained neural network in order to determine at least one of a flutter frequency and a flutter speed of the structure with the one or more completed repairs; and
   the processor determining whether the aeroelastic flutter characteristics of the structure with the one or more completed repairs are acceptable.

15. The computer-implemented method of claim 14, further comprising the processor determining an accuracy of the aeroelastic flutter characteristics determined using the trained neural network.

16. The computer-implemented method of claim 14, further comprising: the processor determining a weight vector in the trained neural network; and the processor determining a bias value in the trained neural network.

17. The computer-implemented method of claim 16, wherein the processor determining the aeroelastic flutter characteristics comprises: the processor multiplying received input parameters by the weight vector to generate weighted parameters; the processor summing the weighted parameters and the bias value to generate a summed input; and the processor applying the summed input to a transfer function associated with a neuron in the trained neural network.

18. A computer-implemented method of performing aeroelastic flutter analysis, the computer-implemented method comprising:
   a processor receiving at least one input parameter related to a completed repair of an aircraft structure;
   the processor applying a predetermined neural network transfer function to the at least one input parameter to generate an aeroelastic flutter analysis result comprising at least one of a flutter frequency and a flutter speed related to the completed repair of the aircraft structure, wherein the aeroelastic flutter analysis result is for determining whether the aircraft structure with the completed repair is acceptable for flight; and
   the processor outputting the result.

19. The computer-implemented method of claim 18, wherein the processor receiving at least one input parameter comprises: the processor receiving a weight; and the processor receiving location of the weight on the aircraft structure.

20. The computer-implemented method of claim 18, wherein the processor applying the predetermined neural network transfer function comprises: the processor multiplying the at least one input parameter with a weight vector to produce at least one weighted input parameter; the processor summing together the at least one weighted input parameter and a bias value to generate a summed value; and the processor applying a neuron transfer function to the summed value.

21. The computer-implemented method of claim 18, wherein the aeroelastic flutter analysis result comprises the flutter speed at a damping value.

22. The computer-implemented method of claim 18, wherein the aeroelastic flutter analysis result comprises the flutter frequency at a damping value.

23. The computer-implemented method of claim 18, wherein the aeroelastic flutter analysis result comprises the flutter speed and the associated flutter frequency at a damping value.

24. The computer-implemented method of claim 18, wherein the aeroelastic flutter analysis result comprises a contour plot of store loadings.

25. One or more processor readable instructions stored in one or more storage devices, the one or more processor readable instructions, when executed by a processor instructing the processor to perform the method comprising:
    receiving at least one input parameter related to a completed repair of an aircraft structure;
    applying a predetermined neural network transfer function to the at least one input parameter to generate an aeroelastic flutter analysis result comprising at least one of a flutter frequency and a flutter speed related to the completed repair of the aircraft structure, wherein the aeroelastic flutter analysis result is for determining whether the aircraft structure with the completed repair is acceptable for flight; and
    outputting the result.

26. One or more processor readable instructions stored in one or more storage devices, the one or more processor readable instructions, when executed be a process instructing the processor to perform the method comprising:
    receiving a mass input related to a completed repair;
    receiving a location of the mass on an aircraft structure;
    multiplying the mass input and location with a weight vector to produce weighted input parameters;
    summing together weighted input parameters and a bias value to generate a summed value;
    applying a neuron transfer function to the summed value to generate an aeroelastic flutter analysis result comprising at least one of a flutter frequency and a flutter speed, wherein the aeroelastic flutter analysis result is for determining whether the aircraft structure with the completed repair is acceptable for flight; and
    outputting the aeroelastic flutter analysis result.

27. An aeroelastic flutter analysis system, the system comprising:
    means for receiving input parameters relating to a completed repair of an aircraft structure;
    means for applying a neural network transfer function to the input parameters to generate an aeroelastic flutter analysis result, comprising at least one of a flutter frequency and a flutter speed, wherein the aeroelastic flutter analysis result is for determining whether the aircraft structure with the completed repair is acceptable for flight; and
    means for outputting the result.

28. The system of claim 1, wherein the one or more input parameters relating to a completed repair of the structure relate to a repair performed on an aircraft.

29. The system of claim 28, wherein the at least one aeroelastic flutter analysis result is generated after the completed repair is completed and before the aircraft is used for flight.

30. The system of claim 1, wherein the structure is at least one of a stabilator, a wing, an elevator, a canard, an aileron, a flap, a spoiler, a stabilizer, a tail section, and a rudder of an aircraft.

31. The system of claim 1, wherein the neural network is a feed forward neural network.

32. The system of claim 5, wherein at least one of the weight and the location of the weight on the structure exceed a predetermined category of approved repair parameters.

33. The computer-implemented method of claim 14, wherein the structure is an aircraft.

34. The computer-implemented method of claim 33, wherein the step of the processor determining aeroelastic flutter characteristics of the structure based in part on the trained neural network is performed after the completed repair is completed and before the aircraft is used for flight.

35. The computer-implemented method of claim 14, wherein the structure is at least one of a stabilator, a wing, an elevator, a canard, an aileron, a flap, a spoiler, a stabilizer, a tail section, and a rudder of an aircraft.

36. The computer-implemented method of claim 14, wherein the neural network is a feed forward neural network.

37. The computer-implemented method of claim 14, wherein the step of the processor determining input parameters further comprises: the processor determining a weight; and the processor determining a location of the weight relating to the one or more completed repairs performed on the structure.

38. The computer-implemented method of claim 37, wherein the weight and the location of the weight relating to the one or more completed repairs performed on the structure exceed a predetermined category of approved repair parameters.

39. The computer-implemented method of claim 18, wherein the step of the processor applying the predetermined neural network transfer function to the at least one input parameter to generate the aeroelastic flutter analysis result is performed after the completed repair is completed and before the aircraft structure is used in flight.

40. The processor readable instructions of claim 25, wherein the step of applying the predetermined neural network transfer function to the at least one input parameter to generate the aeroelastic flutter analysis result is performed after the completed repair is completed and before the aircraft structure is used in flight.

41. The processor readable instructions of claim 25, wherein the aircraft structure is at least one of a stabilator, a wing, an elevator, a canard, an aileron, a flap, a spoiler, a stabilizer, a tail section, and a rudder of an aircraft.

42. The processor readable instructions of claim 25, wherein the step of receiving the at least one input parameter comprises:
    receiving a weight; and
    receiving a location of the weight relating to the completed repair of the aircraft structure.

43. The processor readable instructions of claim 42, wherein the weight and the location of the weight relating to the one or more completed repairs performed on the structure exceed a predetermined category of approved repair parameters.

44. The processor readable instructions of claim 26, wherein the step of applying the neuron transfer function to the summed value to generate the aeroelastic flutter analysis result is performed after the completed repair is completed and before the aircraft structure is used in flight.

45. The system of claim 27, wherein the neural network transfer function is applied to the input parameters to generate the aeroelastic flutter analysis result after the completed repair is completed and before the aircraft structure is used in flight.

46. The system of claim 27, wherein receiving the input parameters comprises:
   receiving a weight; and
   receiving a location of the weight relating to the completed repair of the aircraft structure.

47. The system of claim 46, wherein the weight and the location of the weight relating to the one or more completed repairs performed on the structure exceed predetermined category of approved repair parameters.

* * * * *